R. E. CARPENTER.
AUTOMOBILE REPAIR DEVICE.
APPLICATION FILED JAN. 31, 1914.
1,100,865.
Patented June 23, 1914.
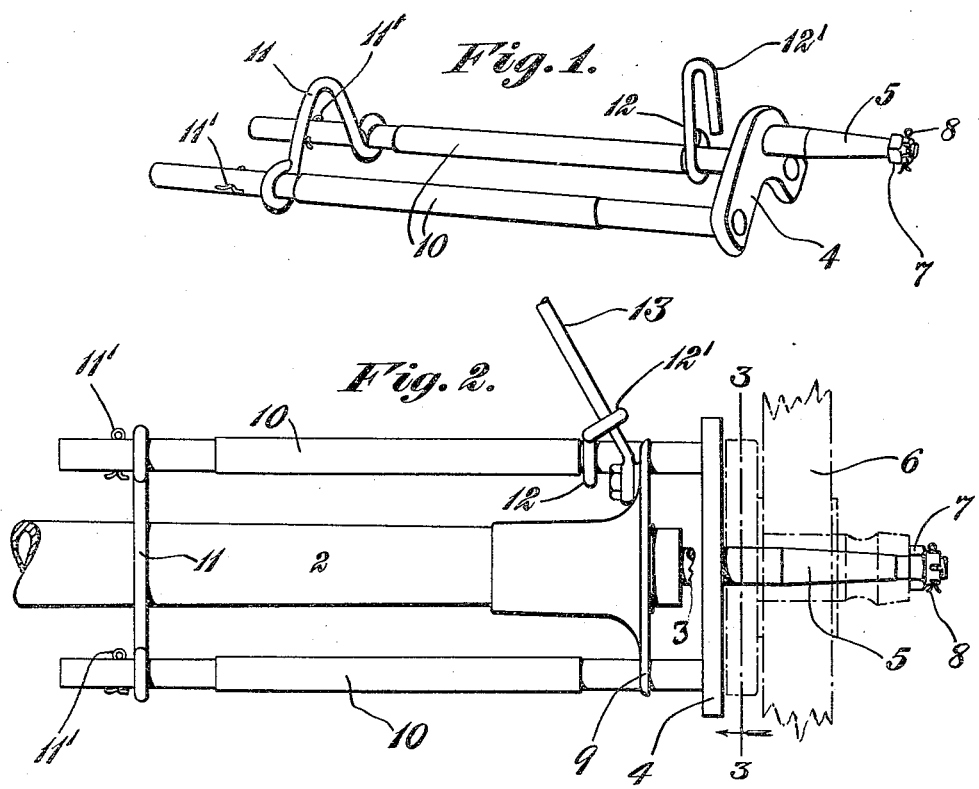
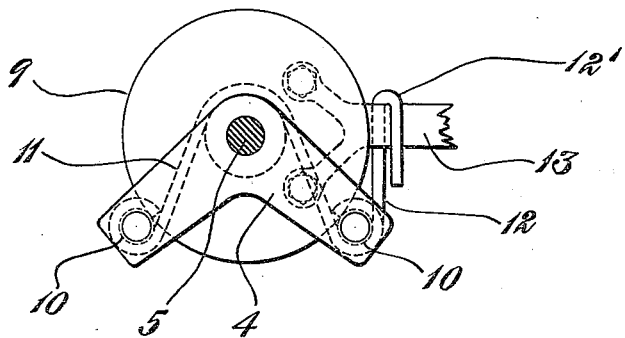
Witnesses:
L. L. Markel.
Inventor:
Ralph E. Carpenter
By his Attorneys,
Sutherland & Anderson

UNITED STATES PATENT OFFICE.

RALPH E. CARPENTER, OF HARTFORD, CONNECTICUT.

AUTOMOBILE REPAIR DEVICE.

1,100,865. Specification of Letters Patent. Patented June 23, 1914.

Application filed January 31, 1914. Serial No. 815,701.

*To all whom it may concern:*

Be it known that I, RALPH E. CARPENTER, a citizen of the United States, residing at Hartford, in the county of Hartford and State of Connecticut, have invented certain new and useful Improvements in Automobile Repair Devices, of which the following is a specification.

This invention relates to what I shall for convenience term "an automobile-repair device," in that while the article is primarily intended for use in conjunction with disabled automobiles, it may be employed with equal facility in other connections.

One of the principal purposes of the invention is the provision of an article of the character noted which can be simply and inexpensively made, readily mounted and dismounted and which is highly effective for the use for which it is designed.

It is a common occurrence for the rear axle of an automobile to break, thus leaving the car on three wheels and practically useless. These accidents as is recognized, generally occur in places inaccessible to garages, necessitating great inconvenience as the cars must be towed varying and frequently long distances. Several expedients have been adopted to attain this end, one being to place a plank under the axle at the missing wheel, and another to mount the broken axle upon a wheeled truck; there are others equally as disadvantageous. By the use of a device involving my invention, I can provide for the towing of a car from a place of breakdown to a repair shop with the same rapidity and ease as though the car were in its normal condition.

In the drawings accompanying and forming part of the present specification I have shown in detail one of the several different forms of embodiment of the invention which to enable those skilled in the art to practice the same will be set forth fully in the following description. As will be clear I do not restrict myself to this disclosure; I may depart therefrom in a number of pronounced respects within the scope of the invention defined by the claims following said description.

Referring to said drawings: Figure 1 is a perspective view of a repair device embodying my invention. Fig. 2 is a top plan of the rear axle, portion of an automobile with the device connected therewith, the wheel shown being dotted, and, Fig. 3 is a transverse section on the line 3—3 of Fig. 2.

Like characters refer to like parts throughout the several views which are on different scales.

In the drawings I have shown part of an automobile of familiar kind, comprising the housing 2 which incloses the rear axle 3 ordinarily divided into two sections connected at their inner ends by the usual differential gear which constituting no part of the invention, is not shown. When one or the other of the sections of the axle breaks the wheel goes with the broken portion of the axle and is incapable of sustaining the car, so that some means has to be adopted to tow the car in its injured state to a place where it can be repaired. I have already referred to the roundabout, cumbersome schemes at present in vogue for accomplishing this result. I do so in a simple, expeditious manner.

It will be assumed as shown in Figs. 2 and 3 that the right axle section, (looking toward the front of the car) has been broken. I provide temporary means which acts as a substitute for the displaced wheel and said means involves in its construction a body of some suitable kind provided with means by which it can be connected solidly yet detachably with the vehicle, and also provided with means for rotatively supporting a wheel, which may be a duplicate of that left with the car. In the case illustrated the substituted wheel would be the one at the right and rear, and the parts will be so constructed that this rear temporary wheel can be brought directly opposite the permanent wheel on the other side of the car and the axes of the two wheels can be in coincidence. The body shown consists of a plate 4 which is approximately flat and as shown as being substantially of crescent form. Although this particular kind of body is of advantage (owing to cheapness and strength) it is of course, not essential. Said body or plate is provided with an outwardly projecting stud which receives for rotation the wheel 6. The stud can be rigidly connected with the plate 4 in any desirable manner, for instance it can be driven through an opening in the plate and headed on the inner surface thereof. The tapered portion of the stud fits the correspondingly tapered wall of the central opening of a wheel as 6 and at its outer end may be furnished with a nut 7 and cotter pin 8 to prevent accidental displacement of the wheel 6 during the towing operation. This plate 4 in the present instance extends across but not necessarily against the outer side of the enlarged terminal portion, disk or flange 9 of the housing 2 and as shown it is provided with inwardly extending bars 10 disposed in parallelism. These bars may be driven through perforations or holes in the plate 4 from the inner side and headed on the outer side or the rods 10 or studs and auxiliary axle or stud 5 could be connected with the plate or equivalent 4 in any other desirable manner. These rods or bars 10 as shown engage against the appropriate flange 9 below the horizontal center thereof and in effect said flange is practically cradled therebetween. To prevent accidental tipping of the body 4 and the two connected rods 10 some suitable means as the arch member 11 may be provided, said arch member as shown having eyes at its ends to slidingly receive the two rods 10, the inner terminals of the rods being adapted to be relatively passed through said eyes. When said arch member is in place it engages over the housing 2 between the point at which the axle is broken and the casing for the differential gear and thereby rigidly maintains the device in place. Said arch member 11 is held against accidental removal in some suitable manner as by the cotter pins 11'. Ordinarily the mounting of the attachment in the manner described is ample to prevent its accidental movement and to firmly hold it in position, but for further security I prefer to provide a hook member as 12, the hook 12' of which is adapted to engage over the appropriate radius rod 13 and the shank of which has a sliding and removable connection with one or the other of the two cradling rods 10. It will be apparent that there need be but one hook member 12 which is adapted to interchangeably fit the two rods. In the example I have given the hook member 12 fits the rod 10 on the right in Fig. 3 as when the device is used in the manner set forth. Should the axle on the opposite side be broken this hook member 12 would be shifted to the companion rod 10 and naturally would engage the opposite rod of the machine.

What I claim is:

1. A device of the class described, comprising a body provided with inwardly extending rods to support and cradle an automobile axle housing, a member connecting the rods and adapted to be supported by the axle housing, and means connected with the body, for supporting a wheel.

2. A device of the class described, comprising a body provided with inwardly extending rods to support and cradle an automobile axle housing and also means for supporting a wheel, and an arch member connecting the rods and adapted to extend over and to be supported by said axle housing.

3. A device of the class described, comprising a body provided with inwardly extending rods to support and cradle an automobile axle housing, an arch member connecting the rods and adapted to be supported by and above the axle housing, means connected with the body for supporting a wheel, and a hook member on one of the rods to engage over a radius rod of said automobile.

In testimony whereof I affix my signature in presence of two witnesses.

RALPH E. CARPENTER.

Witnesses:
  HEATH SUTHERLAND,
  F. E. ANDERSON.